Patented Nov. 16, 1948

2,454,254

UNITED STATES PATENT OFFICE 2,454,254

STABILIZED ORGANIC PEROXIDES

Robert Kuoch, Tonawanda, and Edward S. Shanley, Kenmore, N. Y., assignors to Buffalo Electro-Chemical Company, Inc., Tonawanda, N. Y.

No Drawing. Application February 24, 1944, Serial No. 523,730

9 Claims. (Cl. 260—610)

The present invention relates to a method of storing and transporting unstable organic peroxides and to a stabilized organic peroxide composition.

A very considerable demand for organic peroxides has recently arisen in several industrial fields and particularly in the fields of polymerization and oxidation. While substantially any of the organic peroxides possess utility in these fields, those peroxides relatively high in active oxygen content and relatively the most unstable are of particular efficacy. However, due to the extreme instability of the organic peroxides containing large amounts of active oxygen and relatively few carbon atoms, it has not been possible to utilize to best advantage the action of these compounds in such reactions. Great difficulty has been encountered both in the preparation of the organic peroxides as well as in their storage and transportation. By reason of their extreme sensitivity to decomposition, the use of organic peroxides has been restricted almost entirely to those of very high molecular weight and low active oxygen content, generally those containing 6.6% or less of active oxygen.

Attempts have been made, heretofore, to utilize the unstable organic peroxides by storing them at very low temperatures or even by dissolving them in organic solvents such as ethyl ether or petroleum ether. However, the hazards incident to handling such compounds were not entirely eliminated by this means, and as a matter of fact, due to the flammable nature of most of the organic solvents, the hazard was rather increased than decreased and many instances exist of fire and explosion occurring when such solvents are employed with organic peroxides.

It is an object of the present invention to provide a method of increasing the stability of organic peroxides.

It is also an object of the invention to provide a method of storing organic peroxides wherein their decomposition and loss of actvie oxygen is greatly retarded.

It is also an object of the invention to provide a relatively stable composition containing organic peroxides which composition can be stored and transported with safety.

It is also an object of the invention to provide a substantially water insoluble composition of low vapor pressure, low inflammability, and low evaporation rate possessing properties normally attributable to organic peroxides.

In accordance with the present invention the sensitivity of organic peroxides to decomposition can be very materially reduced and for all practical purposes eliminated, by preparing a solution of the organic peroxide in an ester which is substantially non-water soluble and which possesses an extremely low vapor pressure and low evaporation rate. The solution may be made with any desirable amount of organic peroxide up to the limit of miscibility. It has been found that for most practical uses, the solution should contain at least 25% of the organic ester solvent. In general, the solutions will contain about two parts of the ester to one part of the organic peroxide.

The organic solvents found most suitable for stabilizing the peroxides are those esters having low vapor pressure and a low evaporation rate such as esters of phthalic acid, for instance, dimethylphthalate, diethylphthalate, dioctylphthalate, as well as other esters of phthalic acid normally liquid at room temperatures or which are liquid when admixed with about 25% of an organic peroxide.

The esters of phthalic acid appear to produce ideal vehicles in which to disperse the organic peroxides. Almost without exception, relatively good solution is obtained with the production of a single phase liquid that withstands the agitation and normal temperature variations encountered in normal storage and transportation without separation into mutliple phases or loss of the dispersing ester. Additionally and most important is the fact that the active oxygen content of the solution of organic peroxide in the phthalic acid ester is constant over long periods of time with normal temperature variation encountered in storage thus permitting use of the product with controlled results, particularly when employed in polymerization or similar reactions where the active oxygen content appears to be a determining factor.

For purposes of illustration only, results are given below in Table I showing the marked stability of a phthalic acid ester and acetyl benzoyl peroxide. As similar results are obtainable with organic peroxides, the examples of this table are not to be deemed limitative. Marked contrast will be noted between the active oxygen content of phthalic acid ester solutions and solutions in the other organic solvents.

The stability of various solutions of acetyl benzoyl peroxide in Table I are listed below in terms of active oxygen content. It will be noted that after 61 days' storage at room temperature, no change in the active oxygen content was observed when the organic peroxide was dissolved in an ester of phthalic acid while there was a progressive loss of active oxygen when the peroxide was dissolved in organic solvents heretofore mentioned as suitable carriers therefor. These data are representative and are given as illustrative rather as limitative of the invention since similar data were obtained for solutions of organic peroxides generally in dioctylphthalate and other esters of phthalic acid.

STABILITY OF ACETYL BENZOYL PEROXIDE

Table I

| Time in Days | Stored as Solid | Methyl Alcohol 21% Solution | Dissolved in Benzene 29% Solution | Dissolved in Dioctyl-phthalate 42% Solution |
|---|---|---|---|---|
| PERCENT ACTIVE OXYGEN | | | | |
| 0 | 8.0 | 1.9 | 2.6 | 3.7 |
| 14 | 7.8 | | 2.2 | |
| 20 | | 1.2 | | 3.7 |
| 35 | (¹) | | 2.0 | |
| 49 | | | 1.6 | |
| 61 | | 0.7 | | 3.7 |

¹ Completely liquid.

Although the results of Table I are directed to mixed peroxides, stable compositions of other peroxides are similarly stabilized. Table II shows the remarkable stability of the phthalate composition of diacetyl peroxide as compared with a petrol ether solution.

DIACETYL PEROXIDE

Table II

| Solvent | Percent Peroxide Initial | Percent Peroxide After 26 Days | Percent Loss |
|---|---|---|---|
| Petrol ether | 9.7 | 6.3 | 35.0 |
| Dimethyl phthalate | 21.0 | 20.1 | 4.5 |

The results of Table II are all the more striking when it is recalled that diacetyl peroxide alone decomposes with such extreme rapidity as to be difficultly obtainable.

The stabilized peroxide compositions of the present invention can be employed in those reactions where the organic peroxides have heretofore been employed. The active oxygen content of the composition can be determined by the usual methods of analysis and the exact additions required can be accurately calculated and employed to produce standard results.

What is claimed is:

1. A stabilized organic peroxide composition essentially consisting of a single phase liquid mixture of an alkyl ester of phthalic acid and an organic peroxide containing more than 6.6% active oxygen of the formula $$R-\overset{O}{\underset{\|}{C}}-OO-\overset{O}{\underset{\|}{C}}-R'$$

where R is a straight chain unsubstituted alkyl radical and R' is a radical selected from the class consisting of (a) straight chain unsubstituted alkyl radicals and (b) hydrocarbon monocyclic aryl radicals.

2. A stabilized organic peroxide composition essentially consisting of a single phase liquid mixture of dioctyl phthalate and an organic peroxide containing more than 6.6% active oxygen of the formula $$R-\overset{O}{\underset{\|}{C}}-OO-\overset{O}{\underset{\|}{C}}-R'$$

where R is a straight chain unsubstituted alkyl radical and R' is a radical selected from the class consisting of (a) straight chain unsubstituted alkyl radicals and (b) hydrocarbon monocyclic aryl radicals.

3. A stabilized organic peroxide composition essentially consisting of a single phase liquid mixture of dimethyl phthalate and an organic peroxide containing more than 6.6% active oxygen of the formula $$R-\overset{O}{\underset{\|}{C}}-OO-\overset{O}{\underset{\|}{C}}-R'$$

where R is a straight chain unsubstituted alkyl radical and R' is a radical selected from the class consisting of (a) straight chain unsubstituted alkyl radicals and (b) hydrocarbon monocyclic aryl radicals.

4. A stabilized organic peroxide composition essentially consisting of a single phase liquid mixture of an alkyl ester of phthalic acid and acetyl benzoyl peroxide.

5. A stabilized organic peroxide composition essentially consisting of a single phase liquid mixture of an alkyl ester of phthalic acid and diacetyl peroxide.

6. A stabilized organic peroxide composition essentially consisting of a single phase liquid mixture of dioctyl phthalate and acetyl benzoyl peroxide.

7. A stabilized organic peroxide composition essentially consisting of a single phase liquid mixture of dimethyl phthalate and acetyl benzoyl peroxide.

8. A stabilized organic peroxide composition essentially consisting of a single phase liquid mixture of dioctyl phthalate and diacetyl peroxide.

9. A stabilized organic peroxide composition essentially consisting of a single phase liquid mixture of dimethyl phthalate and diacetyl peroxide.

ROBERT KUOCH.
EDWARD S. SHANLEY.

REFERENCES CITED

The following references are of record in the file of this patent:

UNITED STATES PATENTS

| Number | Name | Date |
|---|---|---|
| 1,754,914 | Stoddard | Apr. 15, 1930 |
| 2,092,322 | Mosser (2) | Sept. 7, 1939 |
| 2,133,733 | Mosser (1) | Oct. 18, 1938 |
| 2,191,520 | Crawford | Feb. 27, 1940 |
| 2,311,327 | Bradley | Feb. 16, 1943 |
| 2,370,588 | Strain | Feb. 27, 1945 |